United States Patent
Cetiner et al.

(10) Patent No.: US 12,038,333 B2
(45) Date of Patent: Jul. 16, 2024

(54) ULTRASONIC WAVEGUIDE FOR IMPROVED ULTRASONIC THERMOMETRY

(71) Applicant: UT-Battelle, LLC, Oak Ridge, TN (US)

(72) Inventors: Nesrin O. Cetiner, Oak Ridge, TN (US); Mustafa S. Cetiner, Oak Ridge, TN (US); Michael J. Roberts, Oak Ridge, TN (US); Thomas R. Muth, Oak Ridge, TN (US); Venugopal K. Varma, Oak Ridge, TN (US); Rosemary A. Montgomery, Oak Ridge, TN (US); Govindarajan Muralidharan, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 868 days.

(21) Appl. No.: 16/999,205

(22) Filed: Aug. 21, 2020

(65) Prior Publication Data
US 2021/0055167 A1 Feb. 25, 2021

Related U.S. Application Data

(60) Provisional application No. 62/889,692, filed on Aug. 21, 2019.

(51) Int. Cl.
*G01K 11/24* (2006.01)
*G01K 11/26* (2006.01)
*G01N 29/22* (2006.01)

(52) U.S. Cl.
CPC .............. *G01K 11/24* (2013.01); *G01K 11/26* (2013.01); *G01N 29/228* (2013.01); *G01N 2291/02881* (2013.01)

(58) Field of Classification Search
None
See application file for complete search history.

(56) References Cited

U.S. PATENT DOCUMENTS

| 4,676,663 A | 6/1987 | Tehon |
| 2007/0131034 A1* | 6/2007 | Ehlert .................... G10K 11/02 73/617 |
| 2016/0273973 A1 | 9/2016 | Larsen et al. |
| 2020/0149980 A1* | 5/2020 | Roth, II .................... G01L 1/10 |

* cited by examiner

*Primary Examiner* — Erica S Lin
(74) *Attorney, Agent, or Firm* — WARNER NORCROSS + JUDD LLP (57) ABSTRACT

An improved ultrasonic waveguide for an ultrasonic thermometry system is provided. The waveguide includes a series of sensing zones, each of which is tuned to a specific narrow frequency band. The waveguide is acoustically coupled to a transducer, which launches a longitudinal elastic wave of desired waveform and frequency. The wave propagates down the waveguide, and is reflected from the sensing zone that is tuned to that frequency. Each sensing zone is designed to be highly reflective to a narrow frequency band while being transparent to other frequencies.

7 Claims, 7 Drawing Sheets

ULTRASONIC WAVEGUIDE FOR IMPROVED ULTRASONIC THERMOMETRY

CROSS-REFERENCE TO RELATED APPLICATIONS

This application claims the benefit of U.S. Provisional Application 62/889,692, filed Aug. 21, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to ultrasonic temperature measurement and more particularly to ultrasonic waveguides for distributed temperature sensing in harsh environments.

BACKGROUND OF THE INVENTION

In the control of nuclear reactors, accurate measurement of temperature has safety significance and efficiency implications. Currently, critical process temperatures in a nuclear reactor are measured using either resistance temperature detectors (RTDs) or thermocouples, both of which exhibit significant performance degradation at operational temperatures of advanced reactors. A common mode of degradation typically arises from a process known as insulation breakdown, which occurs at an accelerated rate at high temperatures, leading to loss of insulation resistance, and resulting in rapid decalibration. This requires the establishment of larger margins for temperature measurements, which impacts the plant's lifecycle availability.

Figure 1:
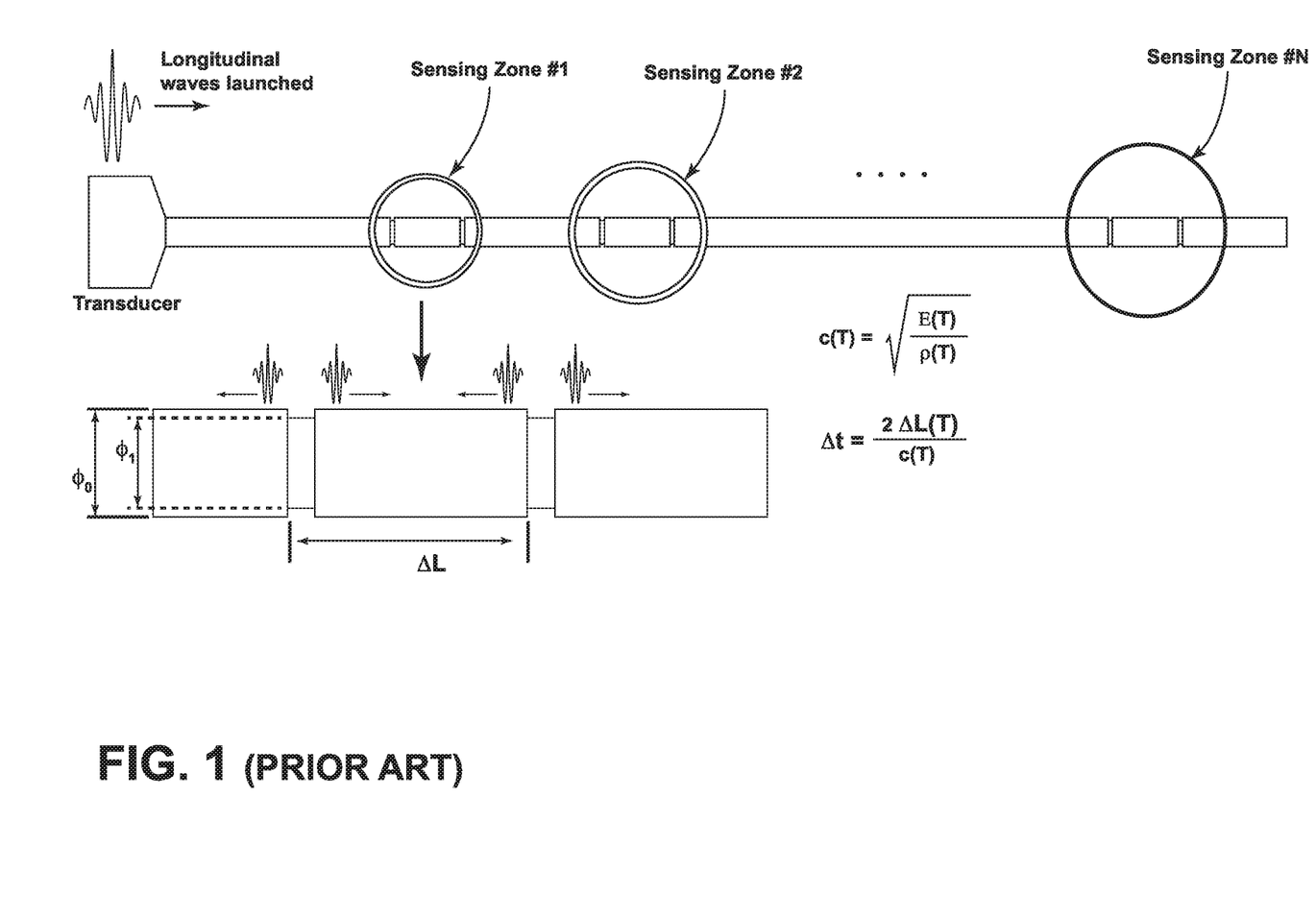
FIG. 1 is a prior art waveguide including multiple sensing zones that are tuned to a common frequency band.

Ultrasonic thermometry offers a robust alternative to RTDs and thermocouples at high temperatures. Ultrasonic thermometry is premised on the principle that the elastic modulus of a material varies as a function of temperature, which in turn affects the velocity at which the waves propagate. Ultrasonic thermometry works by launching elastic waves of known frequency at one end of a solid material, which is typically referred to as an acoustic or ultrasonic waveguide. As shown in FIG. 1, the waveguide typically includes multiple sensing zones along its axis in the form of sudden changes in cross-section or surface discontinuities. Elastic waves of a single frequency propagate down the waveguide and are reflected by these features. The difference in arrival time between two features within each sensing zone, also called time-of-flight, is directly correlated to the local temperature through material property changes.

Ultrasonic thermometry has been around for many decades, however no commercial product exists that can be used as a reliable temperature measurement system for harsh environments. Known interrogation techniques are based entirely on time-domain reflectometry, which has limitations where a low signal-to-noise ratio makes it virtually impossible to make accurate measurements. Conventionally, ultrasonic waveguides employ simple notches of identical geometric features. However, this approach results in the rapid attenuation of acoustic energy as the wave crosses multiple measurement notches, as some of its energy is reflected while the rest is transmitted. This means that while signals from proximal sensing zones can be received with sufficient power, reflections from distal sensing zones may be difficult to measure within measurement noise.

Accordingly, there remains a continued need for an improved waveguide for ultrasonic thermometry with minimal signal attenuation while maximizing the response at each temperature sensing zone to achieve a reliable, highly accurate temperature measurement system.

SUMMARY OF THE INVENTION

An improved ultrasonic waveguide for an ultrasonic thermometry system is provided. The waveguide includes a series of sensing zones, each of which is tuned to a specific narrow frequency band. The waveguide is acoustically coupled to a transducer, which launches a longitudinal elastic wave of desired waveform and frequency. The wave propagates down the waveguide, and is reflected from the sensing zone that is tuned to that specific frequency. Each sensing zone is designed to be highly reflective to a narrow frequency band while being transparent to other frequencies.

The ultrasonic waveguide of the present invention used for distributed temperature sensing includes a series of sensing zones spread out axially along the axis of the waveguide. Each sensing zone is formed by two reflection features, and carries physical information that can be correlated with the local temperature. These features are periodic structures with certain critical attributes that perform filtering functions to meet the design objectives as will be described herein. The number of sensing zones is application specific, and the upper limit is typically constrained by the wavelength of the elastic wave. Measurement is almost entirely based on the difference of arrival times, i.e., time of flight, of waves reflected from the two reflection points. Once calibrated, this time of flight yields a linear relationship against the local temperature in the vicinity of the sensing zone. The waveguide is optionally encased in a sheath with an inert gas, for example helium.

In the prior art, these sensing zones are created by geometric features, such as notches or knots, that have no frequency-specific response. This is shown in FIG. 1 for example, in which a prior art waveguide includes spatially distributed sensing zones that are reflective of a single frequency. The waveguide typically includes multiple sensing zones along its axis in the form of sudden changes in cross-section or surface discontinuities. The elastic waves propagate down the waveguide and are reflected by these features. The difference in arrival time between two features is directly correlated to the local temperature through material property changes, such as the elastic modulus, thermal expansion, etc., at that location. The advantage is that the temperatures about the sensing zones can be interrogated in a single pass at one frequency. However, as the elastic waves propagate down the waveguide, they lose energy as they pass the sensing zones round trip. In the present invention, by contrast, each sensing zone is assigned a specific interrogation frequency. These reflectors in these sensing zones exhibit a sharp frequency response as a notch filter (also called band-stop filter or band-reject filter), which can be adjusted to obtain a desired reflectance/transmittance characteristic around the center frequency. This means that each sensing zone is interrogated individually to obtain the local temperature information rather than interrogating all sensing zones at a single frequency in a single pass as in the prior art.

In one embodiment, the ultrasonic waveguide of the present invention employs a series of sensing zones each of which includes periodic structures formed of fused alternating materials to deliver a similar notch-filter response. These materials are selected based on their acoustic impedance values at the nominal operating temperatures as well as their chemical compatibility with the base waveguide material and the material of the other layer, and mechanical and chemical compatibility with the environment. In one approach of making these periodic structures, layers can be formed by introduction of one material and alternating with the waveguide base material. In an alternative approach, the layers may be selected from materials different from the waveguide base material. In one approach, each layer of the fused alternating materials has a thickness of approximately one-quarter wavelength for the material and the geometry at the center design frequency. Alternatively, the thicknesses of layers can be selected to mimic a sinusoidally varying acoustic impedance to eliminate repeated rejections at odd-multiple harmonics. In yet another alternative method, more complex geometric arrangements can be made that use more than two materials to form a periodic structure using forward- and inverse-physics solutions and implementing an optimization method to yield a narrow and more refined rejection.

For example, the main body of the ultrasonic waveguide is titanium, and the alternating layers include titanium and molybdenum. The alternating layers can be joined via solid-state joining techniques, for example diffusion bonding, which can then be attached to the main body of the waveguide using an appropriate joining technique, such as electron-beam (e-beam) welding or laser welding. Other joining methods can also be employed.

In another embodiment, the ultrasonic waveguide of the present invention includes a series of sensing zones each of which employs periodic structures formed by alternating cross-sectional area. This can be achieved by removal of material using various machining methods and tools. The change in cross-sectional area causes change in the one-dimensional acoustic impedance of the waveguide. In one approach, a sharp step-down variation in area is used. Alternatively, more complex geometric shapes can be adopted to improve the rejection performance. The desired band-rejection response can be obtained in several ways. One method uses thicknesses for each layer that equals one-quarter wavelength for the material and the geometry at the center design frequency. This causes reflected waves at each boundary that are out of phase with the incoming wave. The result is full reflection of incoming waveform within a narrow frequency band around the design frequency. If the incoming wave frequency is outside the band, this condition is no longer satisfied, and the waveform is mostly (ideally fully) transmitted. This design approach leads to a repeated notch-filter behavior where the same wave rejection is observed at odd-numbered harmonics of the center frequency. In an alternative approach, the notch filter is created by varying thicknesses that yield a sinusoidally changing acoustic impedance. In this approach, the spurious rejections can be greatly reduced and rejections at odd-number harmonics are virtually eliminated. Alternatively, other geometric arrangements can be employed using forward- and inverse-physics solutions and implementing an optimization method, such as generic algorithms to yield a narrow and more refined rejection.

The ultrasonic signals are preferably narrow-band sinusoidal waves. In one approach, such a waveform can be created by modulating pure sinusoidal waves of desired interrogation frequency in a Gaussian envelope. Alternatively, a similar waveform can be created again by modulating pure sinusoidal wave of desired interrogation frequency in raised cosine envelope. Other modulation approaches can also be adopted to create a time-limited waveform whose frequency spectrum has a narrow band around the desired interrogation frequency. This is important because a wide-band waveform may suffer from dispersive propagation, particularly at higher frequencies, along the axis of the waveguide resulting in distortion of the original waveform as it travels.

The improved ultrasonic waveguide of the present invention possesses the ability to measure temperature at multiple locations with higher sensitivity in high-temperature and potentially harsh applications, such as the a nuclear reactor core, using a single waveguide thereby reducing the number of instrument penetrations and minimizing the obstructions in the fluid flow path. These and other features and advantages of the present invention will become apparent from the following description of the invention, when viewed in accordance with the accompanying drawings and appended claims.

DETAILED DESCRIPTION OF THE CURRENT EMBODIMENTS

As discussed herein, the current embodiments include ultrasonic waveguides having a series of sensing zones. Each sensing zone is designed to be highly reflective to a narrow frequency band while being transparent to other frequencies. A transducer launches a longitudinal elastic wave of desired waveform and frequency. The wave propagates down the waveguide, and is reflected from the sensing zone that is tuned to that frequency. By detecting arrival time differences between reflected waves from adjacent reflection features that are separated by a known distance, the temperature at each sensing zone can be accurately determined.

I. Sensing Zones of Dissimilar Materials

Figure 2:
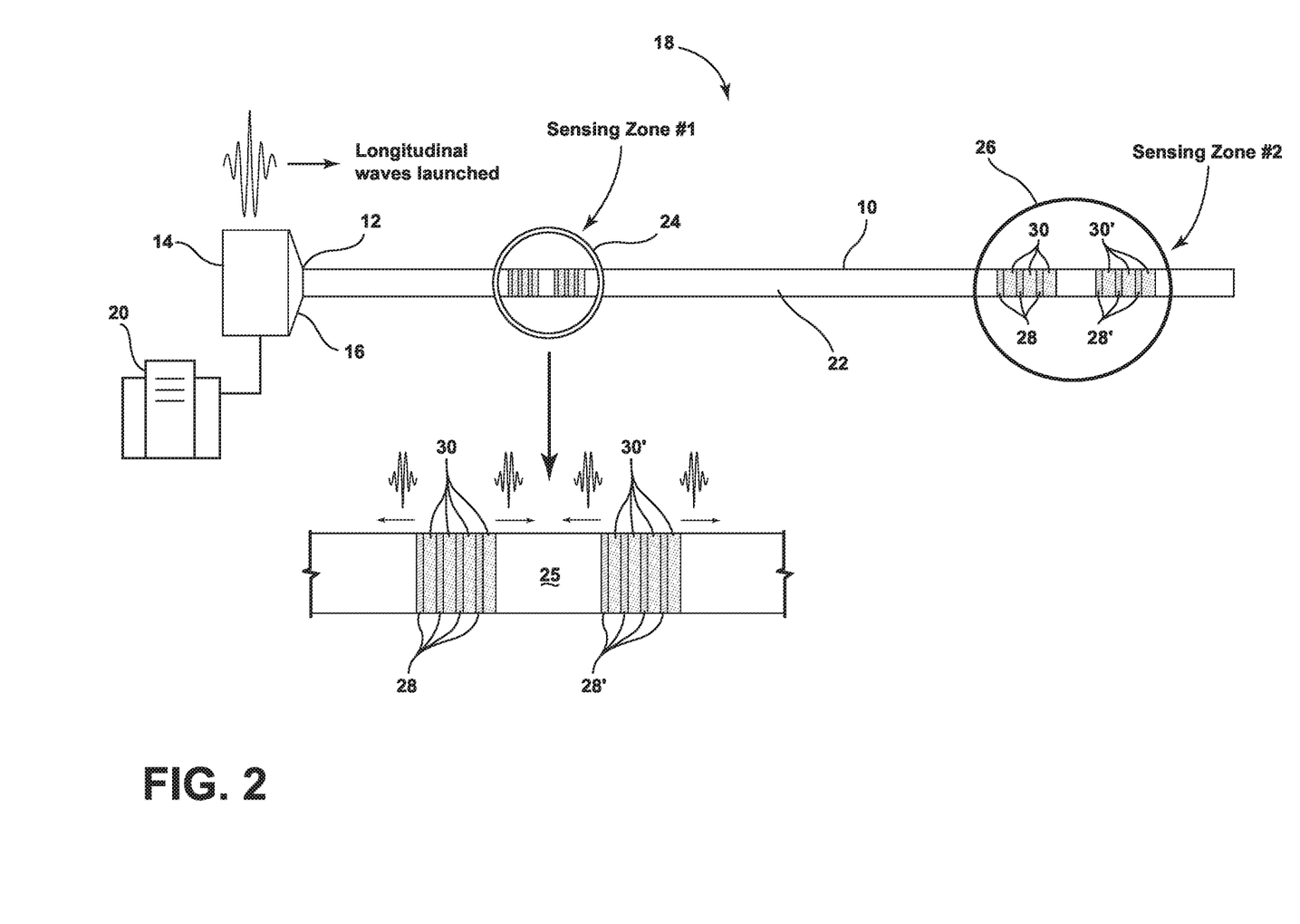
FIG. 2 is an illustration of an ultrasonic thermometry system including an ultrasonic waveguide in accordance with a first embodiment of the present invention.

Referring now to FIG. 2, an ultrasonic waveguide is illustrated and generally designated 10. The waveguide 10 is coupled at a proximal end 12 to an ultrasonic transducer 14. A conical transition coupling 16 can be used to focus the ultrasonic energy. The waveguide 10, the transducer 14, and the transition coupling 16 collectively form an ultrasonic temperature sensor 18. As also shown in FIG. 2, a controller 20 is coupled to the transducer 14 to control the emission and detection of ultrasonic energy in the form of longitudinal elastic waves by the transducer 14. Some embodiments may also include a sheath along all or a portion of the waveguide 10 to protect the waveguide from damage, for example in nuclear applications.

The ultrasonic waveguide 10 includes an elongated body 22, optionally 10 m in length or more, having a plurality of spatially distributed sensing zones, including at least a proximal sensing zone 24 and a distal sensing zone 26. Though two sensing zones are shown, other embodiments can include a greater number of sensing zones. The sensing zones 24, 26 are spatially distributed along the elongated body 22. Each sensing zone includes a tuned band-rejection response, such that each sensing zone is optimized for its own interrogation frequency. For example, the transducer 14 propagates a first ultrasonic signal ($A_1 \sin(\omega_1 t)$) for reflection at the proximal sensing zone 24 and propagates a second ultrasonic signal ($A_2 \sin(\omega_2 t)$) for reflection at the distal sensing zone 26. Each sensing zone 24, 26 is selected to be highly reflective of the corresponding ultrasonic signal, while being transmissive of other ultrasonic signals.

The measurement of temperature at each sensing zone 24, 26 is based on the arrival time difference $\Delta t$ of reflected waves from reflection features within respective sensing zones, the reflection features being separated by a known distance. In the embodiment of FIG. 2, the reflection features are achieved with fused alternating materials, with each reflection features being a boundary between dissimilar materials. The fused alternating materials optionally have a thickness of approximately one-quarter wavelength at the frequency of interrogation ($\omega_1, \omega_2 \ldots \omega_N$) to be reflected, causing the reflective waves at each boundary to interfere constructively. The thickness of the alternating materials creates a critical phase lag between the incident and reflective waves, leading to constructive (or destructive) interference depending on the frequency of interrogation.

The structure and function of each sensing zone 24, 26 will now be described. Each sensing zone includes fused alternating materials comprising a first material and a second material, each having a different acoustic impedance. The acoustic impedance of each material is defined as $Z=\rho c$, where $\rho$ is the density of the medium and c is the acoustic wave velocity. At each boundary between dissimilar materials (i.e., materials having a different acoustic impedance), an acoustic wave in an incident material is partially transmitted through the boundary into the transmissive material and partially reflected back into the incident material.

More particularly, each sensing zone 24, 26 includes alternating first and second layers of dissimilar material to provide ultrasonic reflection features that are separated by a known distance. The fused alternating layers 28, 30 constitute edge filters due to an abrupt change in acoustic impedance between a region of rejection and a region of transmission. The proximal sensing zone 24 of FIG. 2 includes a first multilayer stack and a second multi-layer stack. The first multi-layer stack includes an alternating arrangement of four layers of the primary material 28 and four layers of the secondary material 30. Here, the number of layers is arbitrary, and can be different from one design to another. It is primarily determined by the ratio of acoustic impedances of these layers. Having a higher number of layers improves rejection performance. The second multi-layer stack includes an alternating arrangement of four layers of the primary material 28' and four layers of the secondary material 30'. The second multi-layer stack is axially separated from the first multi-layer stack by an intermediate section 25 of the base material. Each layer 28, 30 defines a uniform outer diameter.

Like the proximal sensing zone 24, the distal sensing zone 26 includes a first multilayer stack and a second multi-layer stack. The first multi-layer stack includes an alternating arrangement of four layers of the primary material 28 and four layers of the secondary material 30. The second multi-layer stack includes an alternating arrangement of four layers of the primary material 28' and four layers of the secondary material 30'. The second multi-layer stack is axially separated from the first multi-layer stack by an intermediate section 25 of the base material. By adding additional layers of material, reflection is maximized and transmission minimized.

The proximal sensing zone 24 is tuned to a higher design frequency of the distal sensing zone 26, such that $f_1 > f_2 > \ldots f_N$. Within the proximal sensing zone 24, each layer of the primary material 28, 28' includes a first axial width $d_1$, and each layer of the secondary material 30, 30' includes a second axial width $d_2$. The first axial width $d_1$ is selected to be equal to a quarter wavelength of the first interrogation frequency $f_1$, and the second axial width $d_2$ is also selected to be equal to a quarter wavelength of the first interrogation frequency $f_1$. Because acoustic velocity is material-dependent, the first axial width $d_1$ is generally not equal to the second axial width $d_2$. Within the distal sensing zone 26, each layer of the primary material 28, 28' includes a third axial width $d_3$, and each layer of the secondary material 30, 30' includes a fourth width $d_4$. The third axial width $d_3$ is selected to be equal to a quarter wavelength of the second interrogation frequency $f_2$, and the fourth axial width $d_4$ is also selected to be equal to a quarter wavelength of the second interrogation frequency $f_2$. Again because acoustic velocity is material-dependent, the third axial width $d_3$ is generally not equal to the fourth axial width $d_4$. In addition, the third axial width $d_3$ is greater than the first axial width $d_1$, and the fourth axial width $d_4$ is greater than the second axial width $d_2$ for the case $f_1 > f_2$. Each layer 28, 30 defines a uniform outer diameter as shown in the inset in FIG. 2.

At each boundary between layers of difference acoustic impedance, a wave is partially transmitted through the boundary and partially reflected. The size of the reflected and transmitted acoustic waves depend on the specific acoustic impedance of the materials comprising the incident layer and the transmissive layer. The characteristic-specific acoustic impedance in a medium of cross-sectional area A is defined as $Z_0 = \rho c / A$. The reflection coefficient $\Gamma_{12}$ at this interface is defined by equation (1) below, and the transmission coefficient $T_{12}$ at this interface is defined by equation (2) below:

$$\Gamma_{12} = \frac{Z_{02} - Z_{01}}{Z_{02} + Z_{01}} \quad (1)$$

$$T_{12} = \frac{2 Z_{02}}{Z_{01} + Z_{02}} \quad (2)$$

By setting the thickness of the transmissive layer at a quarter wavelength of the frequency of interrogation, the second reflected acoustic wave experiences a quarter-wave phase shift due to the time delay traveling through the transmissive layer one time. The reflection at the second interface is determined according to equation (1) above, and the net result is that two left-propagating waves in the incident material constructively interfere. The foregoing constructive interference manifests if transmissive layer acoustic impedance is greater than or less than the incident layer acoustic impedance, e.g., if $Z_{02}>Z_{01}$ and if $Z_{02}<Z_{01}$. In either instance, the alternating first and second layers have an overall reflective nature; that is, the waves keep reflecting and transmitting in both directions in the transmissive layer with diminishing amplitudes and all the net reflections back into the incident layer constructively interfere.

As noted above, the amplitudes of the reflected and transmitted waves depend on the relative specific acoustic impedance of the layers. In one example, the waveguide body 22 is formed from stainless steel, while the alternating layers within each sensing zone 24, 26 are formed from titanium and nickel-based alloys, respectively. Relevant properties for the forging materials are depicted in the table below. By selecting the thickness of each material in the proximal sensing zone 24 as being a quarter wavelength of the frequency of interrogation of a first signal, the proximal sensing zone 24 will strongly reflect a first interrogation signal at 200 kHz (with nearly 100% reflection) while transmitting a second interrogation signal at 400 kHz (with approximately 95% transmission). Here, 200 kHz and 400 kHz are example design and interrogation frequencies. Similarly, by selecting the thickness of each material in the distal sensing zone 26 as being a quarter wavelength of the frequency of interrogation of a second signal, the distal sensing zone 26 will strongly reflect a second interrogation signal at 400 kHz (with nearly 100% reflection).

| Material (at 500° C.) | Density (kg/m$^3$) | CTE (μm/m° C.) | Young's Modulus (GPa) | Wave velocity (m/s) | Acoustic Impedance (kg/m$^2$s) |
|---|---|---|---|---|---|
| SS HT9 | 7,870 | 12.1 | 192 | 4,940 | 3.89E7 |
| Titanium Alloy | 4,540 | 9.7 | 110 | 4,920 | 2.23E7 |
| Nickel Alloy | 8,280 | 12.6 | 172 | 4,990 | 4.14E7 |

The alternating layers 28, 30 can be disc-shaped layers in some embodiments, extending around a narrow portion of the waveguide body 22. The alternating layers 28, 30 can be joined to each other, and to the waveguide body 22, according to solid state joining techniques, including for example diffusion bonding. Other bonding techniques can include cladding fusion bonding, electron beam welding, or laser welding, for example. The waveguide body 22 and the alternating layers 28, 30 can be formed according to additive manufacturing techniques. In addition, the waveguide body 22 and the alternating layers 28, 30 are shown as being cylindrical in shape, however the waveguide body 22 and the alternating layers 28, 30 can include other configurations, including rectangular cross-sectional geometry and other non-standard geometric shapes. In addition, components of an existing system, for example nuclear reactor systems or other industrial process systems, can be modified to include alternating layers of different acoustic impedance to provide spatially distributed temperature sensing as set forth herein.

Figure 5:
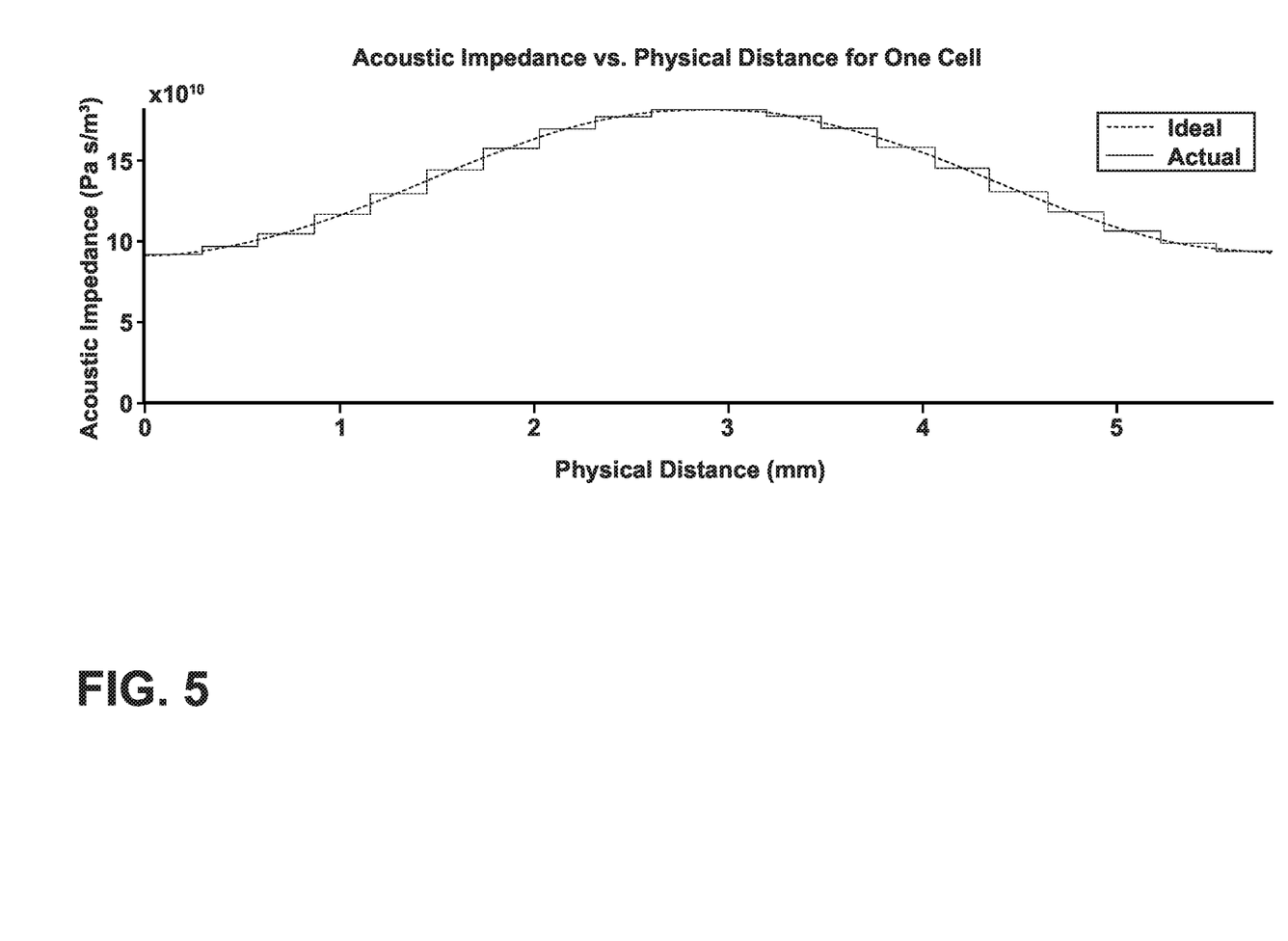
FIG. 5 is a graph illustrating the variation of acoustic impedance as a function of axial waveguide position.
Figure 6:
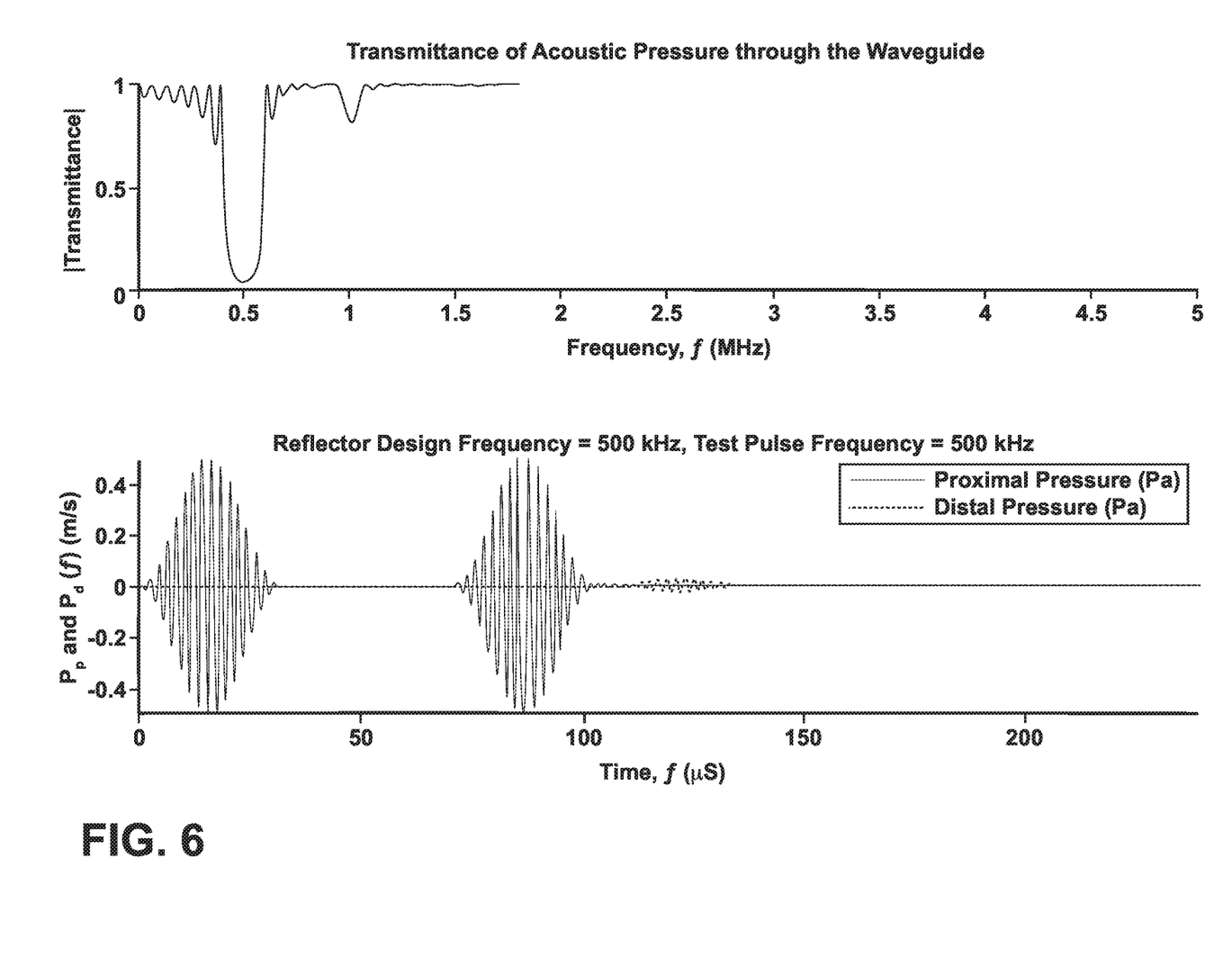
FIG. 6 includes a graph (top) illustrating the transmittance of the sensing zone as a function of interrogation frequency and a graph (bottom) illustrating the time-domain response of the reflector at the design frequency of 500 kHz.

Because the sensing zones 24, 26 also provide strong reflection at all odd multiples of the corresponding frequency of interrogation, the acoustic impedance of the fused alternating layers 28, 30 can be varied sinusoidally instead of sharp quarter-wavelength-thick steps. For example, there can be seven cycles of a sinusoidal variation of acoustic impedance as a function of axial waveguide position. In each cycle, the ideal sinusoidal variation of acoustic impedance is approximately 20 steps as illustrated in FIG. 5. The periodic structure according to this embodiment now reflects strongly in a narrow band around the design frequency of 500 kHz and transmits almost entirely frequencies from about 600 kHz to greater than 5 MHz, as shown in FIG. 6, providing a wide frequency band to allow other sensing zones to be placed along the waveguide for distributed temperature sensing.

Figure 3:
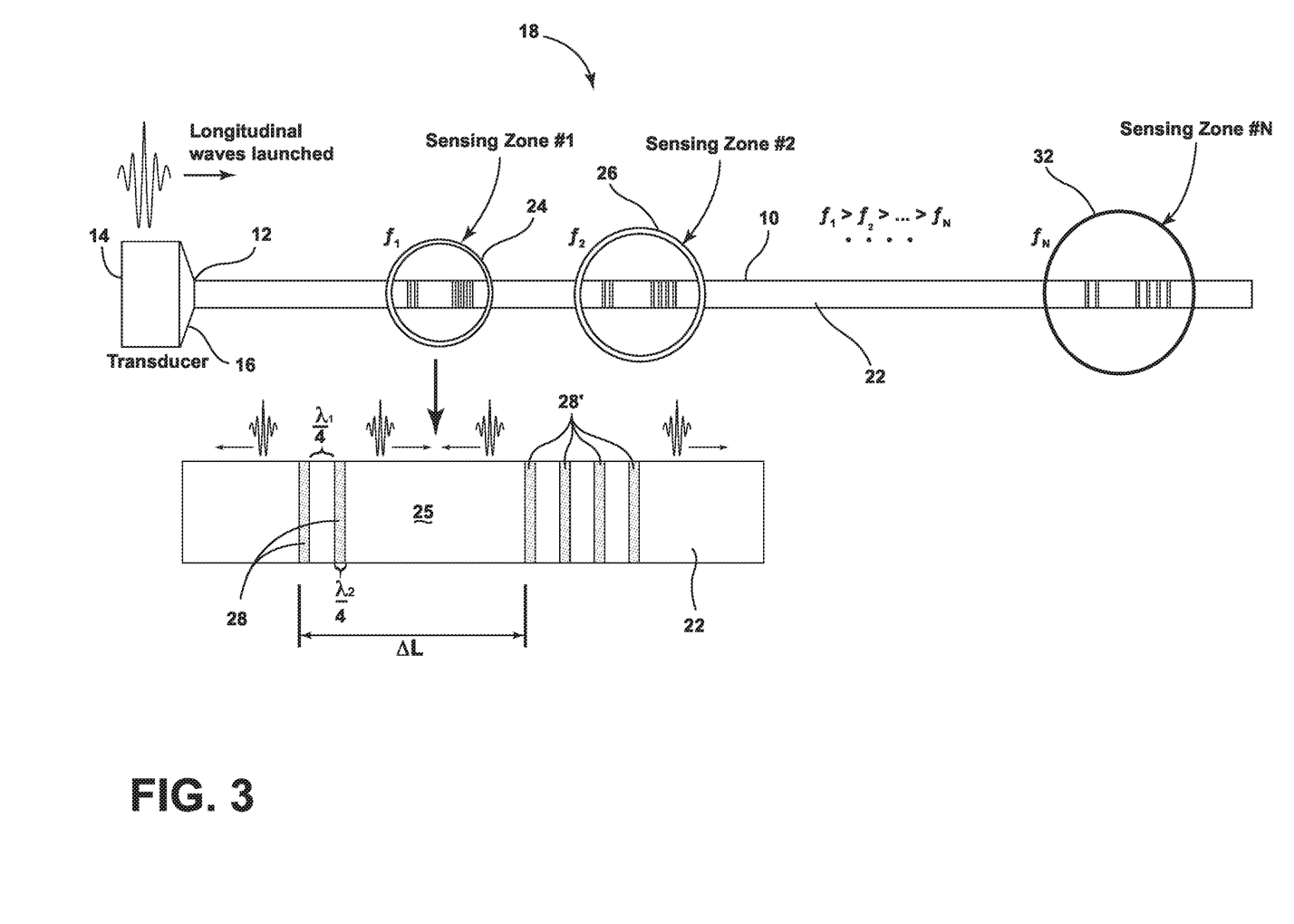
FIG. 3 is an illustration of an ultrasonic thermometry system including an ultrasonic waveguide in accordance with a second embodiment of the present invention.

As alternatively shown in FIG. 3, the sensing zones can include alternating layers of the waveguide base material. For example, the waveguide body 22 can be formed from titanium, while the alternating layers 28, 28' within each sensing zone can be formed from molybdenum. In this embodiment, the waveguide 10 includes N-number of sensing zones, including a first sensing zone 24 and a second sensing zone 26. Each sensing zone includes two reflection features separated by a known distance ΔL. For example, the first reflection feature includes two quarter-wavelength layers 28 of molybdenum separated by a quarter-wavelength layer of titanium, and the second reflection feature includes four quarter-wavelength layers 28' of molybdenum separated by three quarter-wavelength layers of titanium. The first reflection feature in this example 60% transmissive and 40% reflective of the design frequency, and the second reflection feature is nearly 100 reflective of the design frequency. That is, the first reflection feature is partially reflective of the desired elastic wave (having two alternating layers 28), while the second reflection feature (having four alternating layers 28') is fully reflective of the desired elastic wave. By measuring the difference in time-of-arrival of reflected acoustic waves from the first reflection feature and the second reflection feature, which are separated by a known distance ΔL, the elastic modulus and therefore the temperature in the intermediate section 25 of the waveguide body can be determined.

II. Sensing Zones of Geometric Discontinuities

Figure 4:
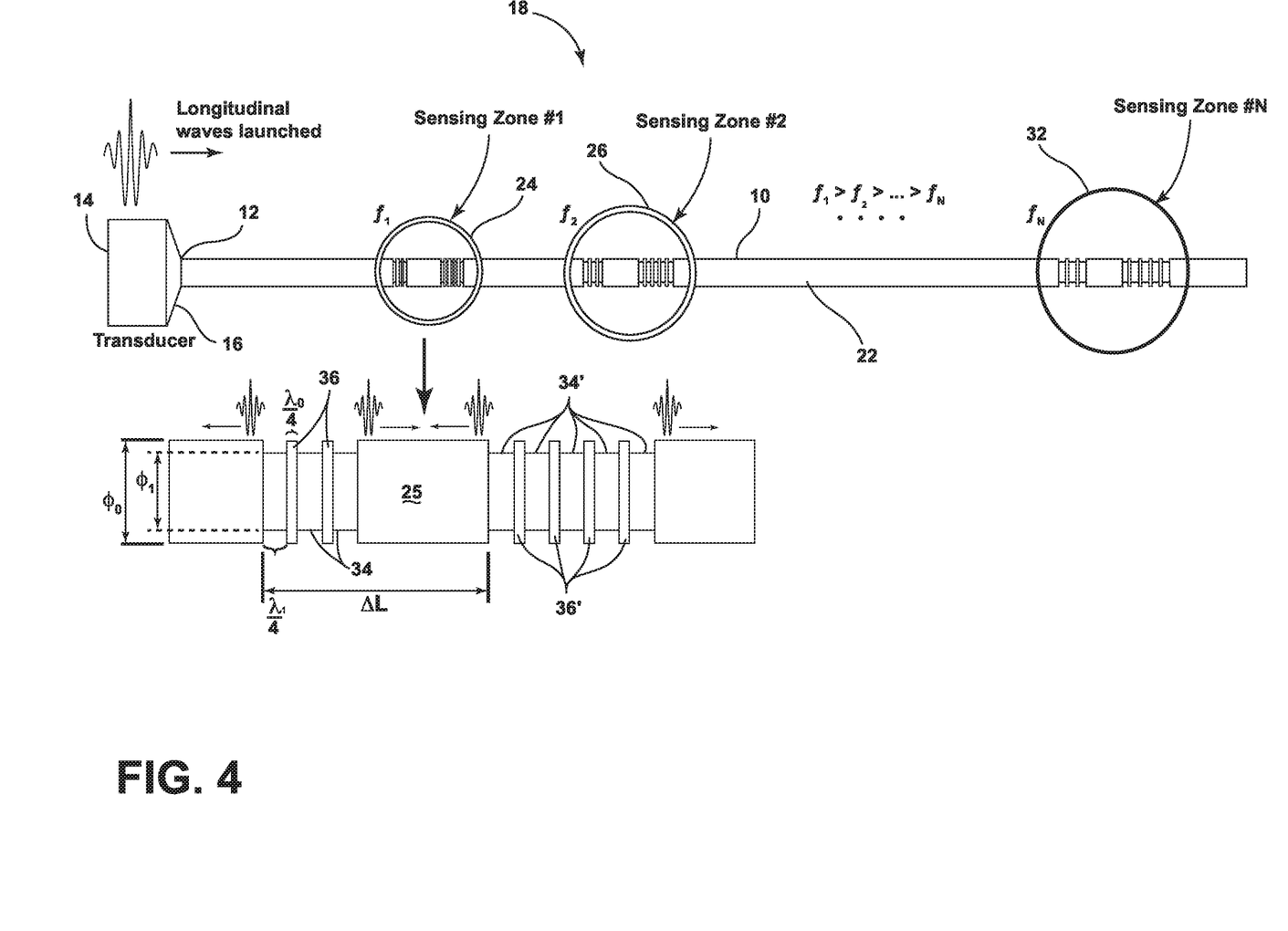
FIG. 4 is an illustration of an ultrasonic thermometry system including an ultrasonic waveguide in accordance with a third embodiment of the present invention.

As shown in FIG. 4, the sensing zones can include layers of alternating cross-sectional area, sometimes referred to as a step-down or corrugated waveguide. Because the cross-sectional area is inversely proportional to characteristic-specific acoustic impedance according to $Z_0=\rho c/A$, the change in cross-sectional area causes change in the one-dimensional acoustic impedance of the waveguide 10. One method uses thicknesses for each layer that equals one-quarter wavelength for the material and the geometry at the center design frequency. This causes reflected waves at each boundary that are out of phase with the incoming wave. The result is full reflection of incoming waveform within a narrow frequency band around the design frequency. If the incoming wave frequency is outside the band, this condition is no longer satisfied, and the waveform is mostly (ideally fully) transmitted. This design approach leads to a repeated notch-filter behavior where the same wave rejection is observed at odd-numbered harmonics of the center frequency. In an alternative approach, the notch filter is created by varying thicknesses that yield a sinusoidally changing acoustic impedance. In this approach, the spurious rejections can be greatly reduced and rejections at odd-number harmonics are virtually eliminated. Alternatively, other geometric arrangements can be employed using forward- and inverse-physics solutions and implementing an optimization method, such as generic algorithms to yield a narrow and more refined rejection.

As further shown in FIG. 4, the waveguide 10 according to this embodiment includes N-number of sensing zones, including a first sensing zone 24 and a second sensing zone 26. Each sensing zone 24, 26 includes two reflection points separated by a known distance ΔL. The first reflection feature includes alternating quarter-wavelength layers 36 of diameter $\phi 0$ and quarter-wavelength layers 34 of diameter $\phi_1$, where $\phi_0 > \phi_1$. The axial width of the stepped-down quarter-wavelength layers 34 is greater than the axial width of the stepped-up quarter-wavelength layers 36, owing to the fact that the acoustic velocity is greater through the stepped-down quarter-wavelength layers 34. The second reflection feature is axially displaced from the first reflection feature by an intermediate region 25 of the waveguide body. The second reflection feature (within the first sensing zone) includes alternating quarter-wavelength layers 36 of diameter $\phi_0$ and quarter-wavelength layers 34 of diameter $\phi_1$. By measuring the difference in time-of-arrival of reflected acoustic waves from the first reflection feature and the second reflection feature (within each sensing zone), which are separated by a known distance ΔL, the elastic modulus and therefore the temperature in the intermediate section 25 of the waveguide body can be determined. In addition, the first reflection feature is generally partially reflective of the desired elastic wave, while the second feature point is fully reflective of the desired elastic wave. As a result, each sensing zone includes a band rejection response that is a function of the quarter-wavelength axial width of alternating sections of different diameter. Alternatively, each reflection feature within a sensing zone can be designed to have a close but slightly different frequency response where the first reflection feature allows a partial transmission while the second reflection feature fully reflects at the design frequency. If the partial reflection from the first reflection feature is about 40%, the reflected waves from the first and the second feature have similar amplitudes.

III. Signal Generation and Processing

Figure 7:
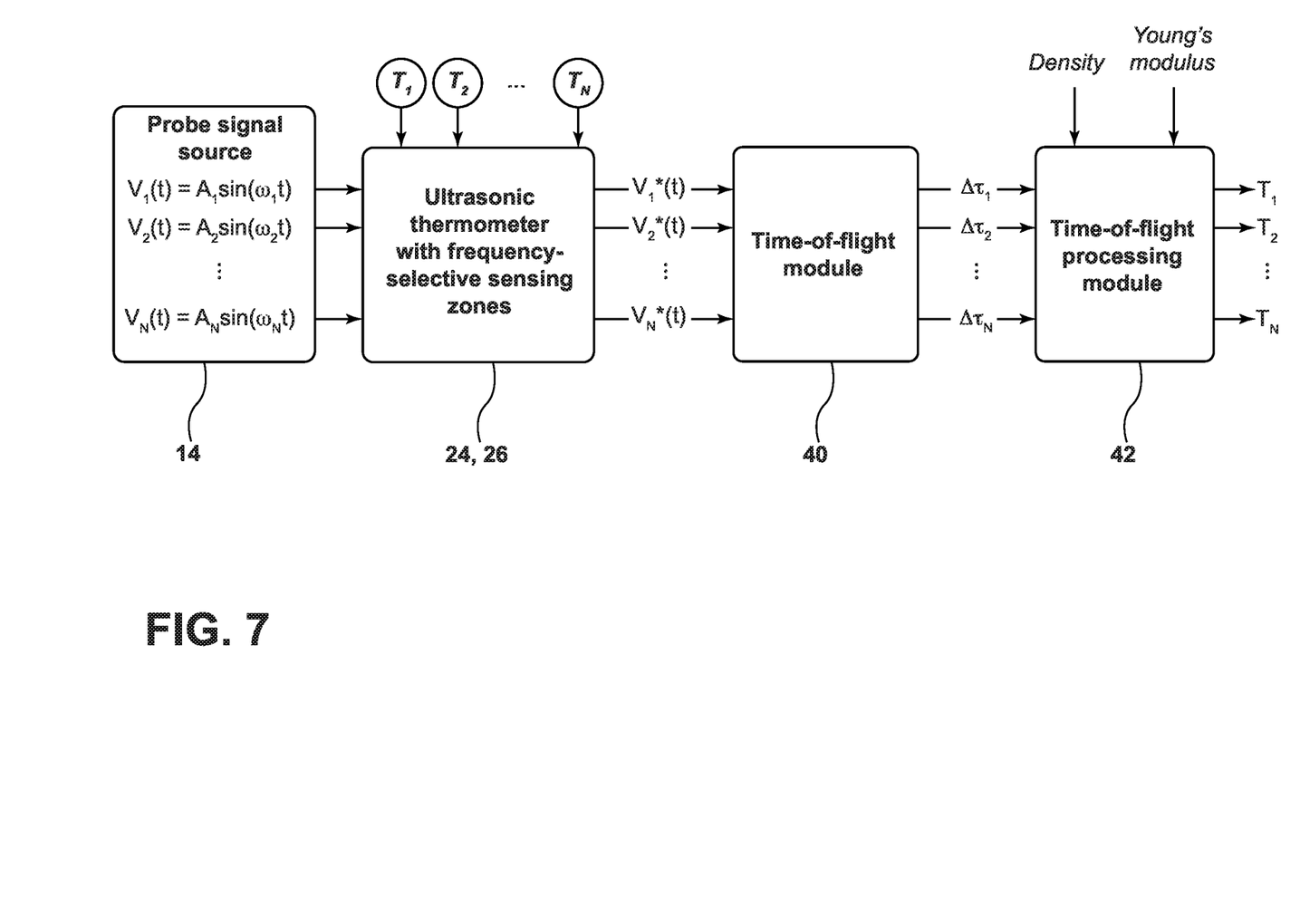
FIG. 7 is a functional block diagram of an ultrasonic thermometry system for detecting temperature at multiple sensing zones.

In operation, a transducer 14 is coupled to a waveguide 10 through a transition coupling 16. The transducer 14 is a piezoelectric transducer in the present embodiment, but can include a magneto-restrictive transducer or an electromagnetic acoustic transducer in other embodiments. The waveguide 10 is compressed as the piezoelectric transducer 14 (or other probe signal source) oscillates at the design frequency. Referring to the functional block diagram of FIG. 7, the magnitude of elastic displacement is determined by the amplitude $(A_1, A_2 \ldots A_N)$ of the probe signal source 14. The longitudinal wave launched at a given frequency of interrogation $(\omega_1, \omega_2 \ldots \omega_N)$ propagates along the waveguide, and the reflected wave causes compression and rarefaction of the piezoelectric crystal, creating an electrical signal. Signal processing is performed by a time of flight module 40 (within controller 20) in the time domain. Time domain interrogation relies on the time-of-flight differences $(\Delta t_1, \Delta t_2 \ldots \Delta t_N)$ between reflected pulses from adjacent reflection points within each sensing zone. A time-of-flight processing module 42 (within controller 20) then determines the temperature $(T_1, T_2 \ldots T_N)$ within each sensing zone for a material of a given density and modulus of elasticity based on the output of the time of flight module $(\Delta t_1, \Delta t_2 \ldots \Delta t_N)$. Because each sensing zone 24, 26 is selected to be highly reflective of only the corresponding ultrasonic signal of a specific design frequency, providing a band rejection response, the ultrasonic waveguide 10 is able to accurately measure temperature at multiple locations in a nuclear reactor core, or in other environments, thereby enhancing the reliable operation of protective functions and achieving the highest operational efficiency possible.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method comprising:
    launching, at a proximal end of an ultrasonic waveguide, a first ultrasonic signal having a first interrogation frequency and a second ultrasonic signal having a second interrogation frequency, the ultrasonic waveguide including an elongated body having a proximal sensing zone located adjacent to the proximal end and a distal sensing zone located downstream from the proximal sensing zone,
        wherein the proximal sensing zone includes a first reflection feature and a second reflection feature axially displaced from the first reflection feature by an intermediate region that are together structured to impart to the proximal sensing zone a band-rejection response tuned to the first interrogation frequency, such that the proximal sensing zone is substantially transmissive of the second ultrasonic signal and any backward-propagating copies thereof, and rejects propagation of the first ultrasonic signal beyond the proximal sensing zone, and reflects two copies of the first ultrasonic signal that are time delayed from each other, so the two time-delayed copies of the first ultrasonic signal return to the proximal end, and
        wherein the distal sensing zone includes another first reflection feature and another second reflection feature axially apart by another intermediate region that are together structured to impart to the distal sensing zone a band-rejection response tuned to the second interrogation frequency, such that the distal sensing zone rejects propagation of the second ultrasonic signal beyond the distal sensing zone and reflects two copies of the second ultrasonic signal that are time delayed from each other, so the two time-delayed copies of the second ultrasonic signal return, through the proximal sensing zone, to the proximal end;
    receiving, at the proximal end, and analyzing the two time-delayed copies of the first ultrasonic signal;
    determining, based on the analyzed two time-delayed copies of the first ultrasonic signal, a first temperature within the proximal sensing zone;
    receiving, at the proximal end, and analyzing the two time-delayed copies of the second ultrasonic signal; and
    determining, based on the analyzed two time-delayed copies of the second ultrasonic signal, a second temperature within the distal sensing zone.

2. The method of claim 1 wherein each of the first and second reflection features of the proximal sensing zone and the first and second reflection features of the distal sensing zone includes alternating layers of a first material and a second material different from the first material.

3. The method of claim 1 wherein each of the first and second reflection features of the proximal sensing zone and each of the first and second reflection features of the distal sensing zone includes alternating layers having alternating first outer diameter and second outer diameter different from the first outer diameter.

4. The method of claim 2 wherein the first material includes a first metal and wherein the second material includes a second metal.

5. The method of claim 2 wherein the elongated body is formed of the second material.

6. The method of claim 1 wherein the first ultrasonic signal and the second ultrasonic signal include a first frequency and a second frequency, respectively, of at least 100 KHz.

7. The method of claim 1 wherein;
analyzing the two time-delayed copies of the first ultrasonic signal reflected from within the proximal sensing zone includes determining a time-of-flight difference between the copies returning from the respective first and second reflection features of the proximal sensing zone, and analyzing the two time-delayed copies of the second ultrasonic signal reflected from within the distal sensing zone includes determining another time-of-flight difference between the copies returning from the respective first and second reflection features of the distal sensing zone.

\* \* \* \* \*

UNITED STATES PATENT AND TRADEMARK OFFICE
CERTIFICATE OF CORRECTION

| | | |
|---|---|---|
| PATENT NO. | : 12,038,333 B2 | Page 1 of 1 |
| APPLICATION NO. | : 16/999205 | |
| DATED | : July 16, 2024 | |
| INVENTOR(S) | : Nesrin O. Cetiner et al. | |

It is certified that error appears in the above-identified patent and that said Letters Patent is hereby corrected as shown below:

On the Title Page

Item (73) Assignee:
"UT-BATTELLE, LLC, Oak Ridge, TN (US)"
Should be:
-- "UT-BATTELLE, LLC, Oak Ridge, TN (US) and
UNIVERSITY OF TENNESSEE RESEARCH FOUNDATION, Knoxville, TN (US) --

Signed and Sealed this
Fourth Day of March, 2025

Coke Morgan Stewart
*Acting Director of the United States Patent and Trademark Office*